United States Patent
Endoh

(10) Patent No.: US 11,108,563 B2
(45) Date of Patent: Aug. 31, 2021

(54) INFORMATION PROCESSING SYSTEM, CLIENT DEVICE, AUTHENTICATION AND AUTHORIZATION SERVER, CONTROL METHOD, AND STORAGE MEDIUM

(71) Applicant: CANON KABUSHIKI KAISHA, Tokyo (JP)

(72) Inventor: Kenta Endoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 16/261,347

(22) Filed: Jan. 29, 2019

(65) Prior Publication Data

US 2019/0238339 A1    Aug. 1, 2019

(30) Foreign Application Priority Data

Jan. 31, 2018    (JP) .............................. JP2018-015726

(51) Int. Cl.
*H04L 9/32*    (2006.01)

(52) U.S. Cl.
CPC .......... *H04L 9/3247* (2013.01); *H04L 9/3213* (2013.01); *H04L 9/3242* (2013.01)

(58) Field of Classification Search
CPC .... H04L 9/3247; H04L 9/3242; H04L 9/3213
See application file for complete search history.

(56) References Cited

U.S. PATENT DOCUMENTS

| | | | | |
|---|---|---|---|---|
| 7,685,206 B1 * | 3/2010 | Mathew | ................ | H04L 63/105 707/785 |
| 2013/0232557 A1 * | 9/2013 | Shimono | ............. | H04L 63/0815 726/4 |
| 2013/0298253 A1 * | 11/2013 | Hwang | ................... | H04L 63/10 726/26 |
| 2014/0033279 A1 * | 1/2014 | Nimashakavi | ...... | H04L 63/0807 726/4 |
| 2016/0224782 A1 * | 8/2016 | Miyakawa | .......... | H04L 63/0838 |
| 2017/0134429 A1 * | 5/2017 | Gustafsson | ........... | H04L 9/3268 |
| 2019/0312730 A1 * | 10/2019 | Engan | ................... | H04L 9/3213 |
| 2019/0327223 A1 * | 10/2019 | Kumar | .................. | H04L 9/0894 |
| 2020/0162441 A1 * | 5/2020 | Kobayashi | ............ | H04L 63/108 |
| 2020/0322151 A1 * | 10/2020 | Latimer | ................ | H04L 63/126 |
| 2020/0336494 A1 * | 10/2020 | Kitagata | ............. | H04L 63/0807 |

FOREIGN PATENT DOCUMENTS

JP    2005-80127 A    3/2005

* cited by examiner

*Primary Examiner* — Matthew Smithers
(74) *Attorney, Agent, or Firm* — Canon U.S.A., Inc. IP Division

(57) ABSTRACT

An information processing system is provided which authenticates and authorizes a client device. In a case where it is determined that an error includes a time of an authentication and authorization server, the information processing system transmits a second authorization token request including the time of the authentication and authorization server to the authentication and authorization server.

12 Claims, 10 Drawing Sheets

FIG.8

```
{ "iss":"12345abc",
  "sub":"567890",
  "and":"https://xxx.canon/service-xxx",
  "iat":1514732400,
  "exp":1514732700
}
```

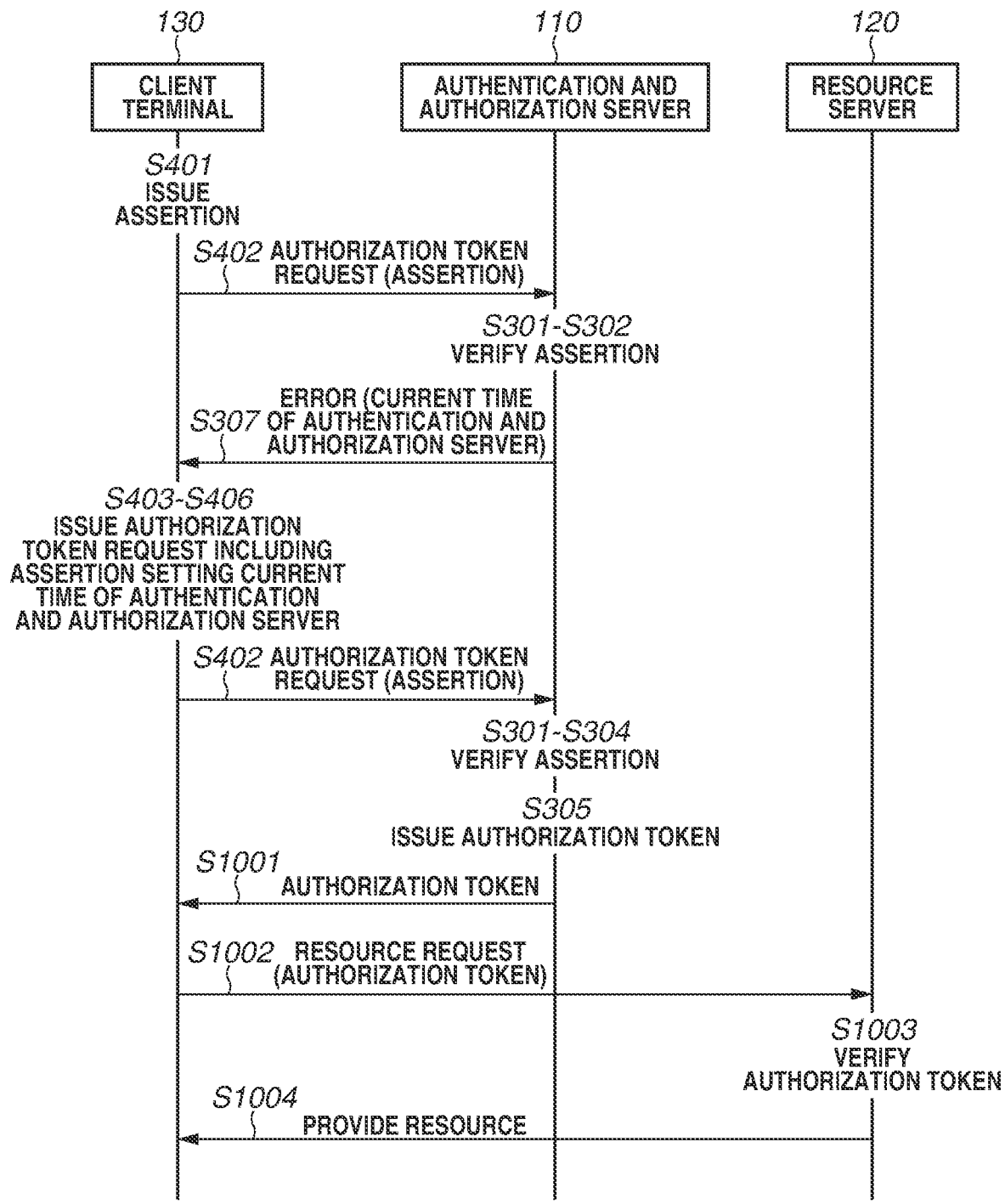

INFORMATION PROCESSING SYSTEM, CLIENT DEVICE, AUTHENTICATION AND AUTHORIZATION SERVER, CONTROL METHOD, AND STORAGE MEDIUM

BACKGROUND

Field

The present disclosure relates to an information processing system which issues an authorization token, a client device, an authentication and authorization server, a control method, and a storage medium.

Description of the Related Art

Recently, use of cloud services deployed on the Internet has been expanded. These cloud services individually disclose Application Programming Interfaces (APIs) of Web services, and functions provided by the services can be used from other applications via the APIs. In standard protocols for calling the APIs, adoption of OAuth 2.0 has progressed for realizing cooperation of authorization.

In OAuth 2.0, a client obtains an authorization token from an authentication and authorization server using authentication information for authenticating the client for accessing an API provided by a resource server. Access to the API is realized by using the obtained authorization token.

As a configuration for transmitting authentication information of a client to the authentication and authorization server, there are a configuration which transmits a client identification (ID) for uniquely identifying the client and a secret as confidential information and a configuration which uses a digital signature (hereinbelow referred to as an assertion) by a digital certificate.

According to the former configuration, a client ID and a secret are confidential information of a client, so that the confidential information of the client is exchanged between the client and the authentication and authorization server. If the confidential information is leaked, an authorization token can be freely issued.

According to the other configuration which uses an assertion, information exchanged between the client and the authentication and authorization server includes a signature and public information which are not the confidential information. Only a client who has an encryption key (a private key) can add a signature to a request to the authentication and authorization server, so that the authentication and authorization server can authenticate the client and issue an authorization token without leaking the confidential information.

An assertion is generally expressed by a JavaScript Object Notation (JSON) Web Token (JWT). In an assertion in the JWT format, signatures are added to various information pieces including an issuer identifier (iss), a user identifier (sub), an identifier of a subject assumed to be used (aud), an issue time (iat), an expiration time (exp), and a token identifier (jti). The authentication and authorization server verifies the signatures and the various information pieces included in the assertion and issues an authorization token when determining that the assertion is valid. On the other hand, when falseness is confirmed as a result of the verification, an error is returned to an authorization token request source.

As described above, in the configuration which authenticates a client based on an assertion, an authorization token request can be transmitted to the authentication and authorization server at any time when the client generates an assertion in the JWT format.

There is a configuration which sets an expiration time to an assertion in order to further improve security. The configuration is used to prevent a replay attack which defrauds an authorization token request including an assertion and obtains an authorization token using the authorization token request. In order to improve security, it is desirable to set an expiration time of an assertion as short as possible. Thus, for example, a configuration can be considered which does not accept an assertion of which a difference between the expiration time of the assertion and an issue time of the assertion is five minutes or more. Japanese Patent Application Laid-Open No. 2005-80127 describes a method for issuing an electronic certificate including an issue time or an expiration time of the electronic certificate itself.

SUMMARY

An information processing system includes a client terminal configured to add a signature using an encryption key to a request, and an authentication and authorization server which issues an authorization token for accessing a resource server and which is configured to verify the signature added to the request from the client terminal using a decryption key, wherein the client terminal includes a transmission unit configured to transmit, to the authentication and authorization server, an authorization token request including a time at which the signature is issued in order to obtain an authorization token and a verification unit configured to receive and verify, from the authentication and authorization server, a response to the authorization token request, wherein the authentication and authorization server includes a determination unit configured to determine whether at least a predetermined time difference is present between an issue time of the signature included in the authorization token request transmitted by the transmission unit and a time of the authentication and authorization server and a response unit configured to respond based on a determination result by the determination unit, wherein, in a case where the determination unit determines that at least a predetermined time difference is present between an issue time of the signature included in a first authorization token request transmitted by the transmission unit and the time of the authentication and authorization server, the response unit responds to the client terminal with an error including the time of the authentication and authorization server, and wherein, in a case where the verification unit of the client terminal verifies that the error includes the time of the authentication and authorization server, the transmission unit of the client terminal transmits a second authorization token request including the time of the authentication and authorization server to the authentication and authorization server.

Further features will become apparent from the following description of exemplary embodiments with reference to the attached drawings.

BRIEF DESCRIPTION OF THE DRAWINGS

FIG. 8 illustrates an example of verification information included in an assertion in a JWT format.

FIG. 10 is a sequence diagram illustrating that a client terminal in an information processing system obtains an authorization token.

DESCRIPTION OF THE EMBODIMENTS

In a case of a system in which a difference between an expiration time of an assertion and an issue time of the assertion, the expiration time and the issue time of the assertion are targets of verification. Accordingly, when the issue time of the assertion set by the client is determined as false by an authentication and authorization server, an authorization token is not issued. A case in which a false issue time is set by the client is, specifically, a case in which a current time set in the client is deviated from a current time of the authentication and authorization server and a case in which the client does not have a clock function. The issue time of the assertion is set based on the current time set by the client, and thus the false issue time is set to the assertion.

The present disclosure is directed to a smooth operation of an information processing system which issues an authorization token by adjusting an issue time of an assertion when the issue time of the assertion set by a client terminal is different from a current time of an authentication and authorization server and causing the client terminal to retransmit an authorization token request.

Exemplary embodiments for implementing the present disclosure will be described in detail below with reference to the attached drawings.

According to a first exemplary embodiment, various servers on the Internet are provided with applications. The applications provide various functions (services) to a client terminal in cooperation with the client terminal.

Figure 1:
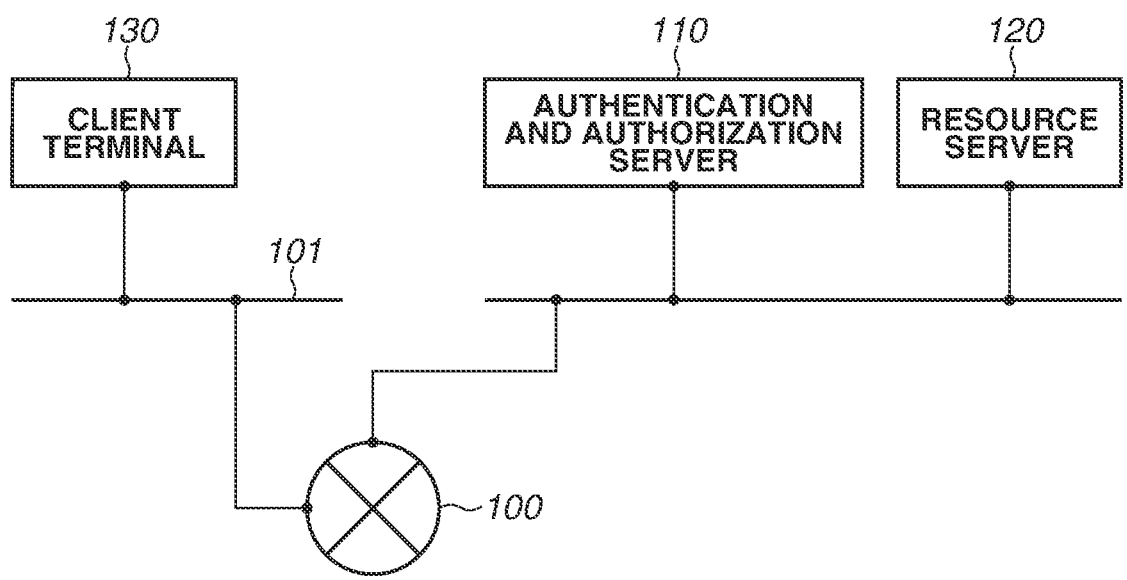
FIG. 1 is a configuration diagram of an information processing system.

An information processing system according to the present exemplary embodiment is realized on a network having a configuration illustrated in FIG. 1.

A wide area network (WAN) 100 constitutes a World Wide Web (WWW) system and connects to various devices via a local area network (LAN) 101. The various devices include a client terminal 130, an authentication and authorization server 110 which realizes authentication and authorization of the client terminal 130, and a resource server 120 which provides a service to the client terminal 130.

The services provided by the resource server 120 includes, for example, a service for backing up data of the client terminal 130 and a service for analyzing sensor information of the client terminal 130. The client terminal 130 specifically includes devices such as a personal computer, a mobile terminal, and an image formation device.

The authentication and authorization server 110 authenticates the client terminal 130, receives an authorization token request from the authenticated client terminal, and issues an authorization token necessary for using the resource server 120.

FIG. 1 illustrates a configuration in which various servers are individually installed, however, a configuration may be adopted which provides functions of the authentication and authorization server 110 and the resource server 120 as, for example, an authentication and authorization service system regardless of the physical number and configuration of devices. Further, the functions of the authentication and authorization server 110 and the resource server 120 may be realized by a plurality of physical servers.

Figure 2:
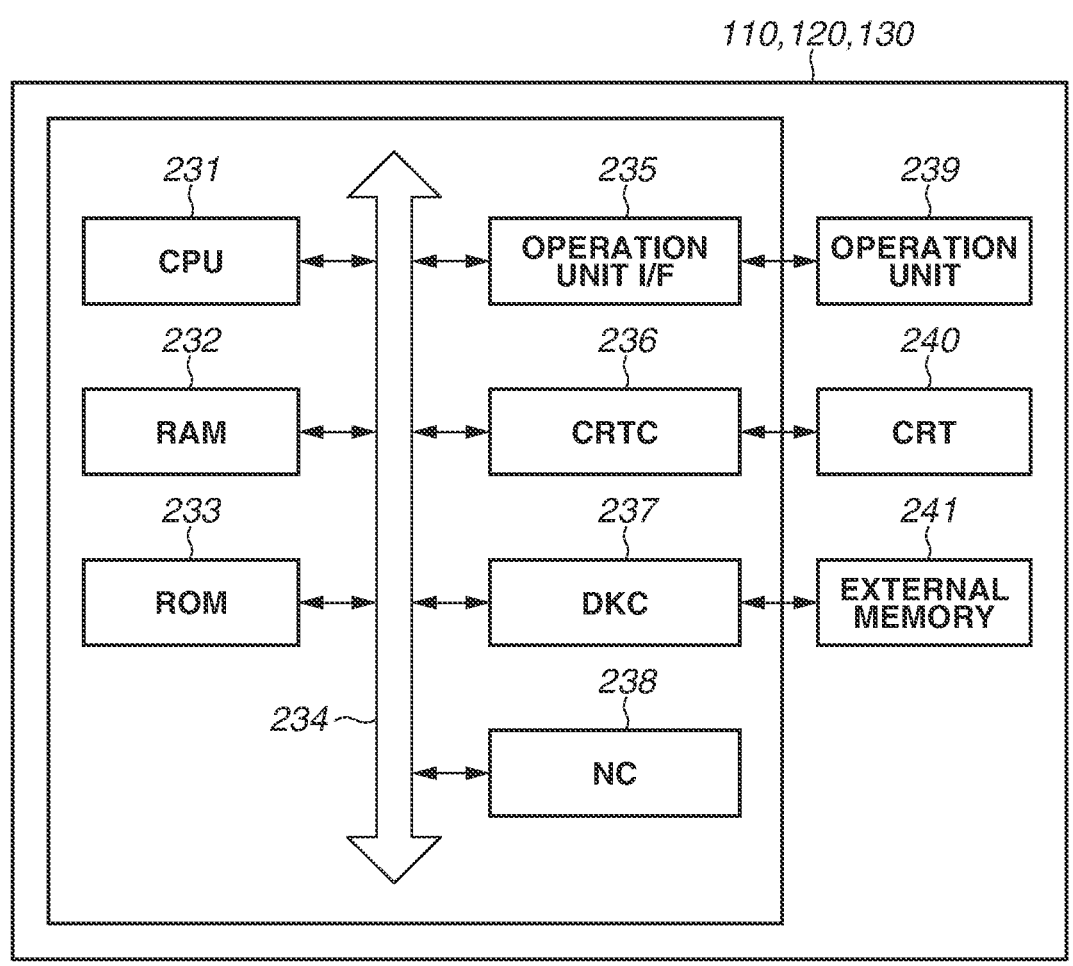
FIG. 2 is a hardware configuration diagram of various devices constituting the information processing system.

FIG. 2 is a general hardware configuration of an information processing apparatus constituting the authentication and authorization server 110, the resource server 120, and the client terminal 130 according to the present exemplary embodiment. FIG. 2 is a block diagram illustrating a general information processing apparatus, and a hardware configuration of a general information processing apparatus and a virtual hardware configuration of an information processing apparatus provided as an Infrastructure as a Service (IaaS) can be applied to various devices according to the present exemplary embodiment.

A central processing unit (CPU) 231 executes a program of an operation system (OS) and an application stored in a program read-only memory (ROM) of a ROM 233 or loaded from an external memory 241 such as a hard disk (HD) to a random access memory (RAM) 232. Further, the CPU 231 controls each block connected to a system bus 234. The OS operates on a computer. Processing in each sequence described below can be realized by execution of the program. The RAM 232 functions as a main memory, a work memory, and the like of the CPU 231. An operation unit interface (I/F) 235 controls an input from an operation unit 239. A cathode-ray tube controller (CRTC) 236 controls display on a CRT display 240. A disk controller (DKC) 237 controls data access in the external memory 241 such as a hard disk (HD) which stores various data pieces. A network controller (NC) 238 executes communication control processing with respect to the various devices connected via the WAN 100 or the LAN 101.

In all of the following descriptions, a subject of execution in hardware is the CPU 231, and a subject of execution in software is an application program installed in the external memory 241, unless otherwise noted.

Figure 9:
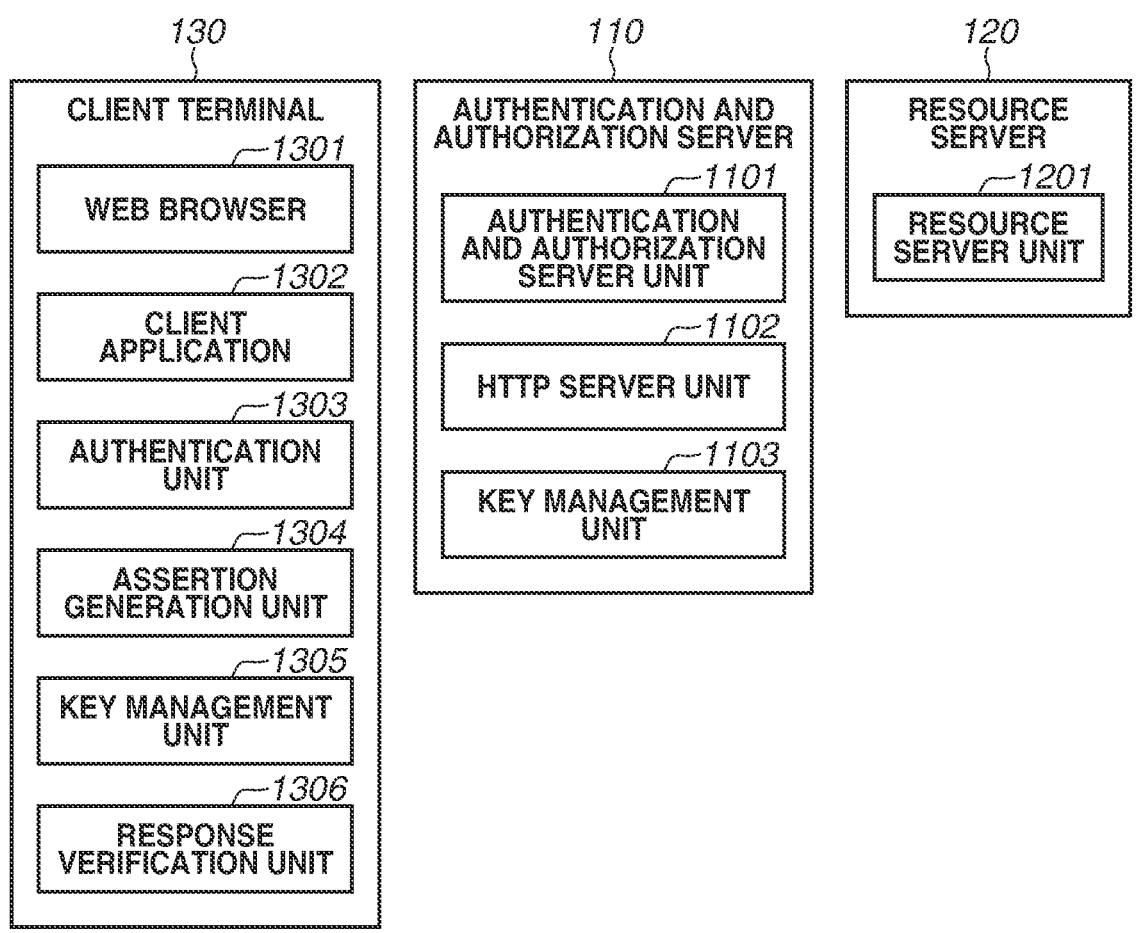
FIG. 9 is a software module configuration diagram of various devices.

Next, functions of the authentication and authorization server 110, the resource server 120, and the client terminal 130 are described with reference to FIG. 9. The authentication and authorization server 110 includes an authentication and authorization server unit 1101, a HyperText Transfer Protocol (HTTP) server unit 1102, and a key management unit 1103. The HTTP server unit 1102 which is connected to the client terminal 130 and the resource server 120 via the WAN 100 is a function of performing HTTP communication. Further, the HTTP server unit 1102 can perform communication by secure socket layer (SSL)/transport layer security (TLS) and includes a certificate store not illustrated.

The authentication and authorization server unit 1101 is a function of receiving a request from a Web browser 1301 via the HTTP server unit 1102 and responding in a result to the received request. More specifically, the HTTP server unit 1102 receives an authorization token request from the Web browser 1301 and verifies an assertion included in the authorization token request. When succeeding in the verification, the HTTP server unit 1102 generates and transmits an authorization token to the Web browser 1301. In this regard, the authentication and authorization server unit 1101 verifies a signature of the assertion received from the client terminal 130 using a decryption key (a public key) preliminarily managed by the key management unit 1103.

The authentication and authorization server unit 1101 can be configured to store a private key for adding signature information to the generated authorization token. In that case, the signature information is added to the authorization token using the private key, and the authorization token added with the signature information is issued to the client terminal 130.

A resource server unit 1201 in the resource server 120 is a function of disclosing an Application Programming Interfaces (API) for providing a Web service. The resource server 120 may include an HTTP server unit and execute reception and transmission between an external device via the HTTP server unit as with the authentication and authorization server 110.

The client terminal 130 includes the Web browser 1301, a client application 1302, an authentication unit 1303, an assertion generation unit 1304, a key management unit 1305, and a response verification unit 1306. The Web browser 1301 is a function realized by a user agent for using the WWW. The Web browser 1301 communicates with the authentication and authorization server 110 and the client application 1302 by a user operation. The client application 1302 executes the API disclosed by the resource server 120 and thus provides a Web service together with the function provided by the client application 1302 itself to a user.

The authentication unit 1303 is a function of authenticating a user. A user inputs a local user identification (ID) and a local user password on an input screen, not illustrated, of the client terminal 130 to use the functions of the client terminal 130. When receiving the input, the client terminal 130 checks the input information against information (the local user ID and the local user password) preliminarily registered in the authentication unit 1303 to perform user authentication processing and generates a login context. The form of authentication processing is not limited to the above-described one and may be, for example, authentication using an integrated circuit (IC) card and biometric authentication using a fingerprint.

The login context is information for identifying a local user by the client terminal 130 and constitutes, for example, the local user ID. The login context is shared by the client application 1302 and the authentication unit 1303. The functions included in the various devices are described above.

The assertion generation unit 1304 performs a function of adding a signature to an authorization token request using the private key preliminarily managed by the key management unit 1305. The response verification unit 1306 provides a function of verifying whether an authorization token or a current time of the authentication and authorization server 110 is included in a response received from the authentication and authorization server 110.

Figure 3:
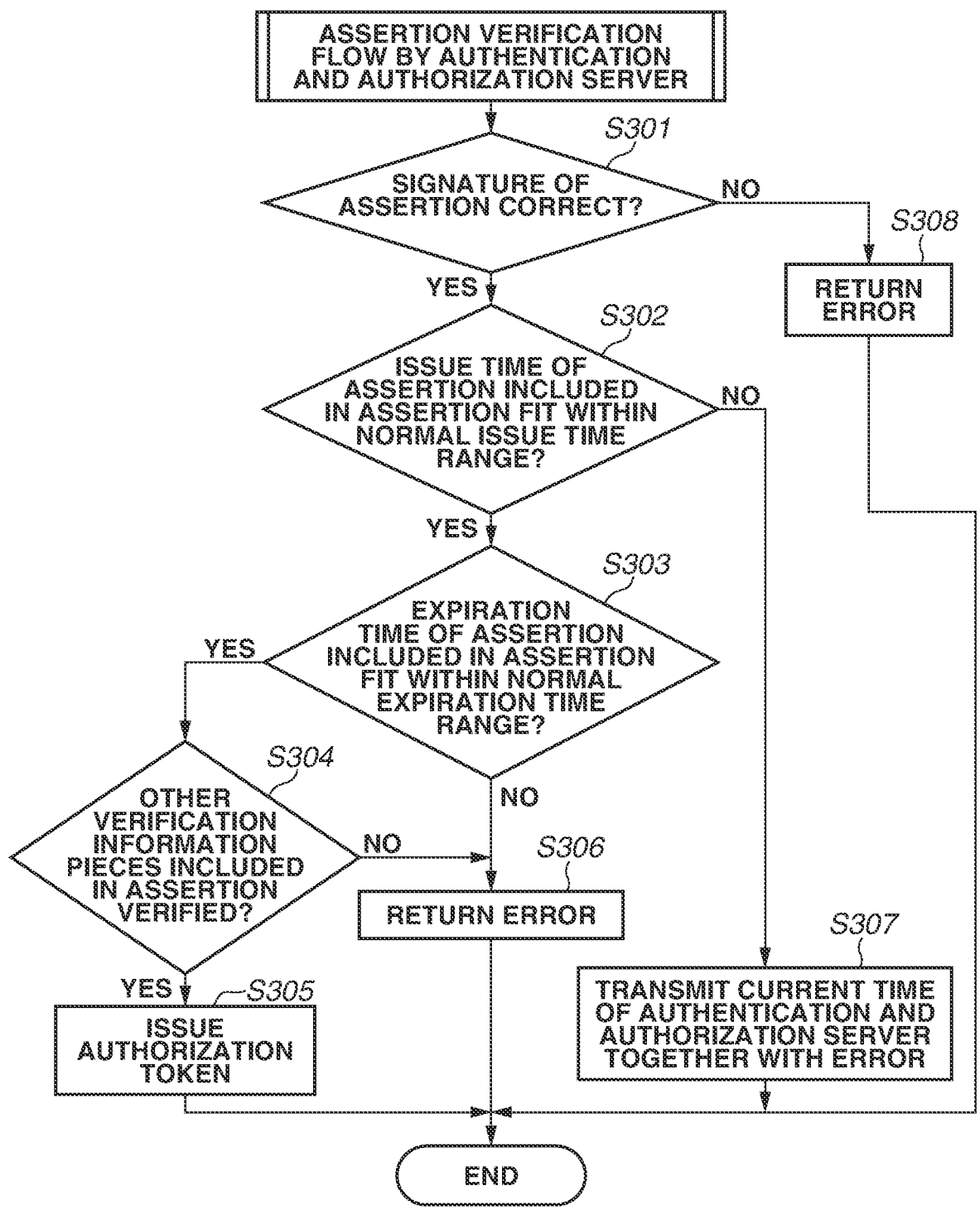
FIG. 3 is a flowchart illustrating verification of an assertion in a JavaScript Object Notation (JSON) Web Token (JWT) format in an authentication and authorization server according to a first exemplary embodiment.

Verification processing of an assertion in the JWT format by the authentication and authorization server 110 is described with reference to FIG. 3. Processing illustrated in a flowchart in FIG. 3 is executed by the authentication and authorization server 110 in response to the receipt of the authorization token request from the client terminal 130.

In step S301, the authentication and authorization server unit 1101 verifies the signature of the assertion included in the authorization token request received from the client terminal 130. When the signature is verified, a public key preliminarily managed by the key management unit 1103 is used. When it is determined that the signature is correct as a result of the verification (YES in step S301), the processing proceeds to step S302, and when it is determined that the signature is not correct (NO in step S301), the processing proceeds to S307.

In step S302, the authentication and authorization server unit 1101 obtains the issue time of the assertion from the information included in the assertion and confirms whether the issue time fits within a normal issue time range set by the authentication and authorization server 110. The normal issue time range is a deviation range allowable from the current time. For example, when the normal issue time range is ±five minutes, a value t1 with respect to "the current time of the authentication and authorization server 110−five minutes"≤t1≤"the current time of the authentication and authorization server 110+five minutes" corresponds to the normal issue time range. When the issue time of the assertion ("iat" described below) is within the normal issue time range (YES in step S302), the processing proceeds to step S303, and when the issue time of the assertion is not within the normal issue time range (NO in step S302), the processing proceeds to step S307.

FIG. 8 illustrates an example of verification information included in an assertion. The assertion includes an identifier of the client terminal 130 (iss), a user identifier (sub), a service identifier (aud), an issue time of the assertion (iat), and an expiration time of the assertion (exp).

The identifier of the client terminal 130 is an identifier which can uniquely identify the client terminal 130 and may be a serial number of the device.

The user identifier is an identifier which can uniquely identify the user. Specifically, a uniform resource locator (URL) of a request transmission destination to the resource server is set to a service identifier.

The verification information in FIG. 8 is information which is issued by the authentication and authorization server 110 when the client terminal 130 is registered as a client to the authentication and authorization server 110 and when the authentication and authorization server 110 issues the private key to the client terminal 130 and shared by the client terminal 130 and the authentication and authorization server 110. The assertion includes header information in addition to the verification information in FIG. 8 and is constituted by being added with the signature performed using the private key of the client terminal 130.

The description returns to FIG. 3. In step S303, the authentication and authorization server unit 1101 obtains the expiration time (exp) of the assertion from the information included in the assertion and confirms whether the expiration time of the assertion fits within a normal expiration time range set by the authentication and authorization server 110. The normal expiration time range is, for example, when the expiration time of the assertion is five minutes, a value t2 in a range of "the current time of the authentication and authorization server 110"≤t2≤"the current time of the authentication and authorization server 110+five minutes". The expiration time of the assertion set to the assertion is preliminarily set by the client terminal 130, and the expiration time can be changed depending on a service which is used by using the authorization token.

In step S303, when the expiration time fits within the normal expiration time range (YES in step S303), the processing proceeds to step S304, and when the expiration time is out of the normal expiration time range (NO in step S303), the processing proceeds to step S306.

In step S304, the authentication and authorization server unit 1101 verifies other verification information pieces included in the assertion. The other verification information pieces include, for example, the identifier of the client terminal 130 (iss) and the user identifier (sub), however, information and a condition to be a verification target are not particularly limited. When the verification is successful in step S304 (YES in step S304), in step S305, the authentication and authorization server unit 1101 issues an authorization token, and when the verification fails (NO in step S304), the processing proceeds to step S306.

According to the present exemplary embodiment, the configuration is described in which the issue time and the expiration time of the assertion are verified, and subsequently the other verification information is verified. However, verification of the other verification information may occur before verifying the issue time and the expiration time. The order of verification does not matter.

When the other verification information pieces included in the assertion are false (NO in step S304), in step S306, the authentication and authorization server unit 1101 returns an error to the Web browser 1301 and terminates the processing. As error information, information of a correct expiration time and the like can be returned together with the error for the client terminal 130 to correct the assertion.

In step S302, when it is determined that the issue time of the assertion does not fit within the normal issue time range (NO in step S302), in step S307, the authentication and authorization server unit 1101 determines that a clock in the client terminal 130 does not operate normally (or the client terminal 130 does not include a clock) and returns an error including the current time of the authentication and authorization server 110.

In step S301, when it is determined that the signature of the assertion is false (NO in step S301), in step S308, the authentication and authorization server unit 1101 returns an error to the Web browser 1301 and terminates the processing. Thus, the verification flow of an assertion by the authentication and authorization server 110 is described above.

Figure 4:
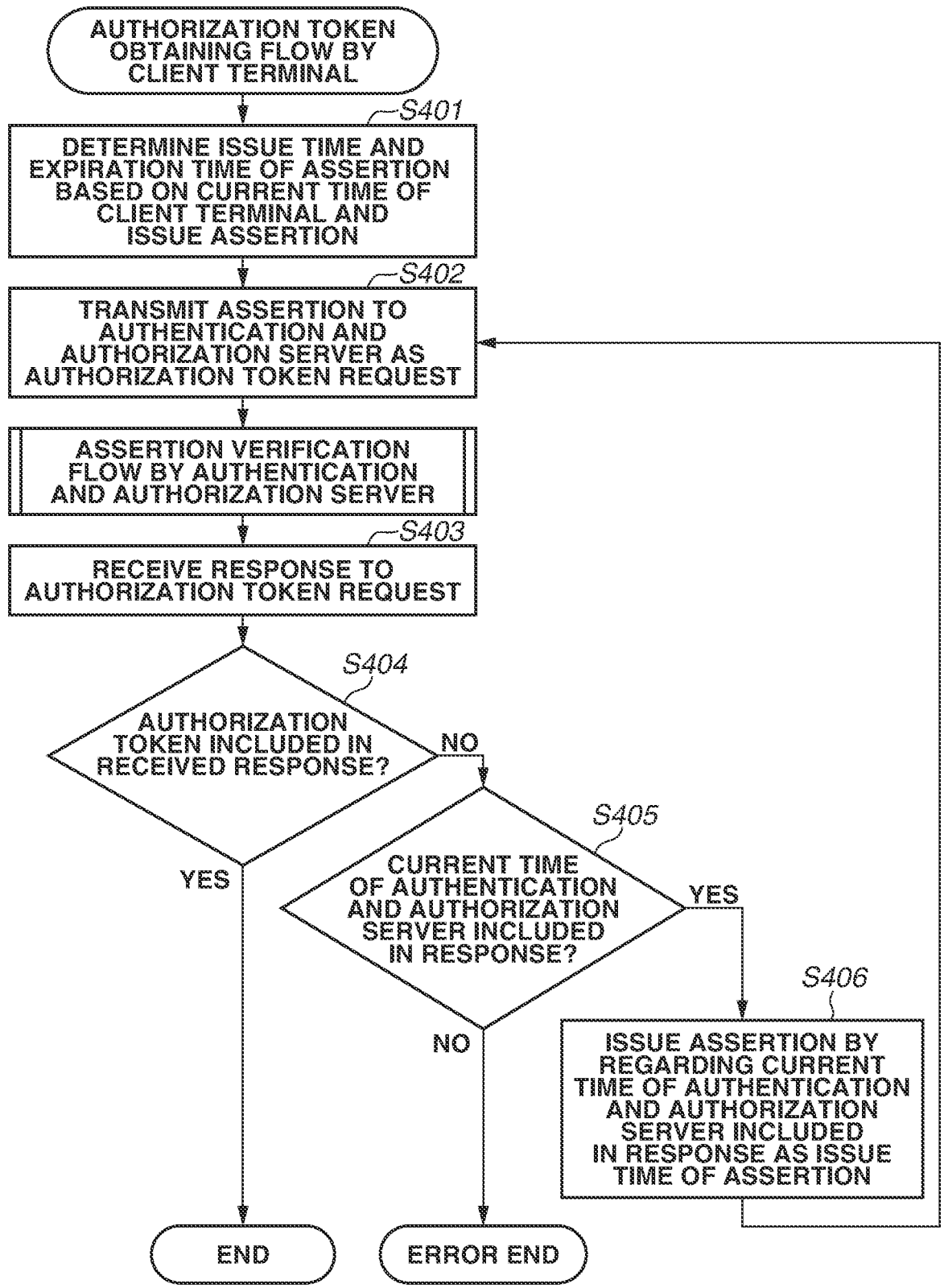
FIG. 4 is a flowchart illustrating obtaining of an authorization token by a client terminal according to the first exemplary embodiment.

Processing for obtaining an authorization token by the client terminal 130 is described with reference to FIG. 4.

In step S401, the assertion generation unit 1304 determines the issue time and the expiration time of the assertion based on the current time of the client terminal 130 and issues the assertion. When the assertion is issued, a signature is provided to the verification information including the determined issue time and the expiration time using the preliminarily stored private key.

As a method for determining the expiration time of the assertion, it is specifically performed in such a manner that when the expiration time of the assertion is five minutes, the expiration time of the assertion is determined as "2018.01.01 12:05:00" with respect to the issue time of the assertion "2018.01.01 12:00:00".

In step S402, the Web browser 1301 transmits the assertion issued in step S401 to the authentication and authorization server 110 as the authorization token request. The processing in the authentication and authorization server 110 performed after receiving the authorization token request is as described above with reference to the flowchart in FIG. 3.

After the processing in FIG. 3, in step S403, the Web browser 1301 receives a response to the authorization token request.

In step S404, the response verification unit 1306 determines whether an authorization token is included in the received response. When it is determined that the authorization token is included (YES in step S404), the processing is terminated, and when it is determined that the authorization token is not included (NO in step S404), the processing proceeds to step S405.

In step S405, the response verification unit 1306 determines whether the current time of the authentication and authorization server 110 is included in the response. When it is determined that the current time is included (YES in step S405), the processing proceeds to step S406, and when it is determined that the current time is not included (NO in step S405), the present processing is terminated as an error.

In step S406, the assertion generation unit 1304 reissues the assertion based on the current time of the authentication and authorization server 110 included in the response. In this regard, the assertion generation unit 1304 regards the current time of the authentication and authorization server 110 as the issue time of the assertion and determines the expiration time of the signature based on the relevant issue time. Further, the assertion generation unit 1304 signs the assertion including the determined issue time and the expiration time with the private key and reissues the assertion. In step S402, the issued assertion is transmitted to the authentication and authorization server 110 as the authorization token request.

Figure 5:
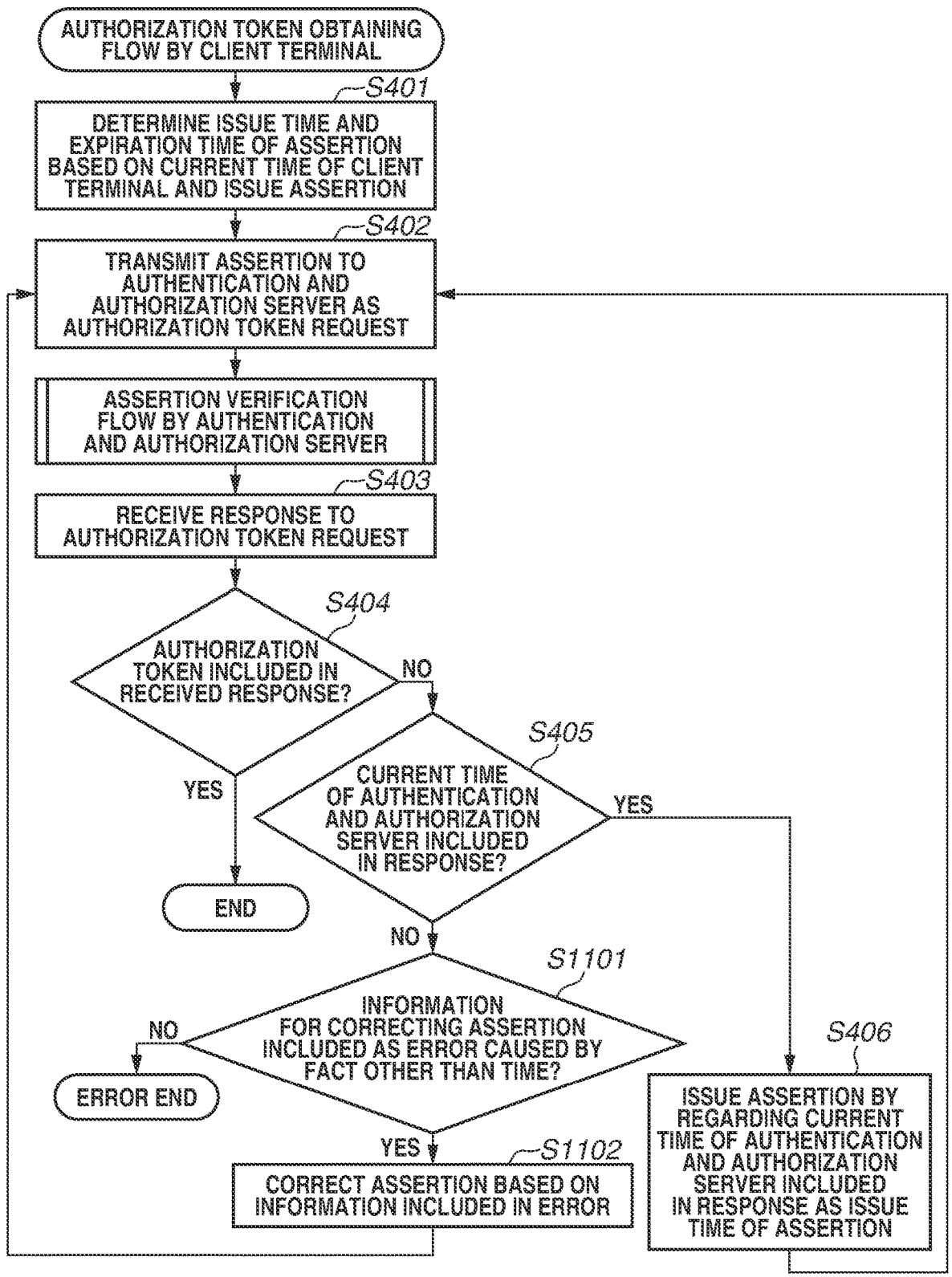
FIG. 5 is a flowchart illustrating obtaining of an authorization token by the client terminal according to the first exemplary embodiment.

According to the present exemplary embodiment, when the response does not include the current time in step S405, the processing is terminated as an error, however, a measure when obtaining of the authorization token fails is not limited to the above-described one. For example, as in the flowchart in FIG. 5, in step S1101, it is determined whether information for correcting the assertion is included in an error caused by a fact other than the time. When it is determined that the information is included (YES in step S1101), in step S1102, the assertion is corrected based on the information. When it is determined that the information is not included (NO in step S1101), the processing is terminated as an error. After step S1102, the processing returns to step S402, and the assertion generation unit 1304 transmits the corrected assertion to the authentication and authorization server 110. As an example of an error caused by a fact other than the time, an error of the user identifier and the like included in the verification information (FIG. 8) can be considered.

The authorization token obtaining flow by the client terminal 130 is described above.

FIG. 10 is a sequence diagram from when the client terminal 130 transmits the authorization token request to when a resource is provided to the client terminal 130. Parts which are already described above are denoted by the same reference numerals, and the detailed descriptions thereof are omitted.

In step S305, when the authentication and authorization server 110 issues the authorization token, in step S1001, the issued authorization token is transmitted to the client terminal 130. In step S1002, the issued authorization token is transmitted to the resource server unit 1201 as a resource request, and, in step S1004, the resource is provided to the client terminal 130 in response to that the authorization token is verified in step S1003. The processing from when the authorization token request is transmitted to when the resource is provided is described above.

According to the present exemplary embodiment, if the current time of the client terminal 130 is different from the current time of the authentication and authorization server 110, the client terminal 130 can transmit a new authorization token request based on the current time of the authentication and authorization server 110.

According to a second exemplary embodiment, a configuration is described in which an authorization token is obtained without correcting an assertion based on an error from an authentication and authorization server 110 at every authorization token request. Descriptions of the parts which are already described in the first exemplary embodiment are omitted.

According to the second exemplary embodiment, the client terminal 130 includes a clock or a counter value indicating counts from start-up of the client terminal. The counter value is a value to be counted up from zero (0) each time a device which does not include a clock.

Verification processing of an assertion by the authentication and authorization server 110 is similar to that according to the first exemplary embodiment (FIG. 3), and thus the description thereof is omitted. The processing already described in the first exemplary embodiment is denoted by the same reference numeral, and the detailed description thereof is omitted.

Figure 6:
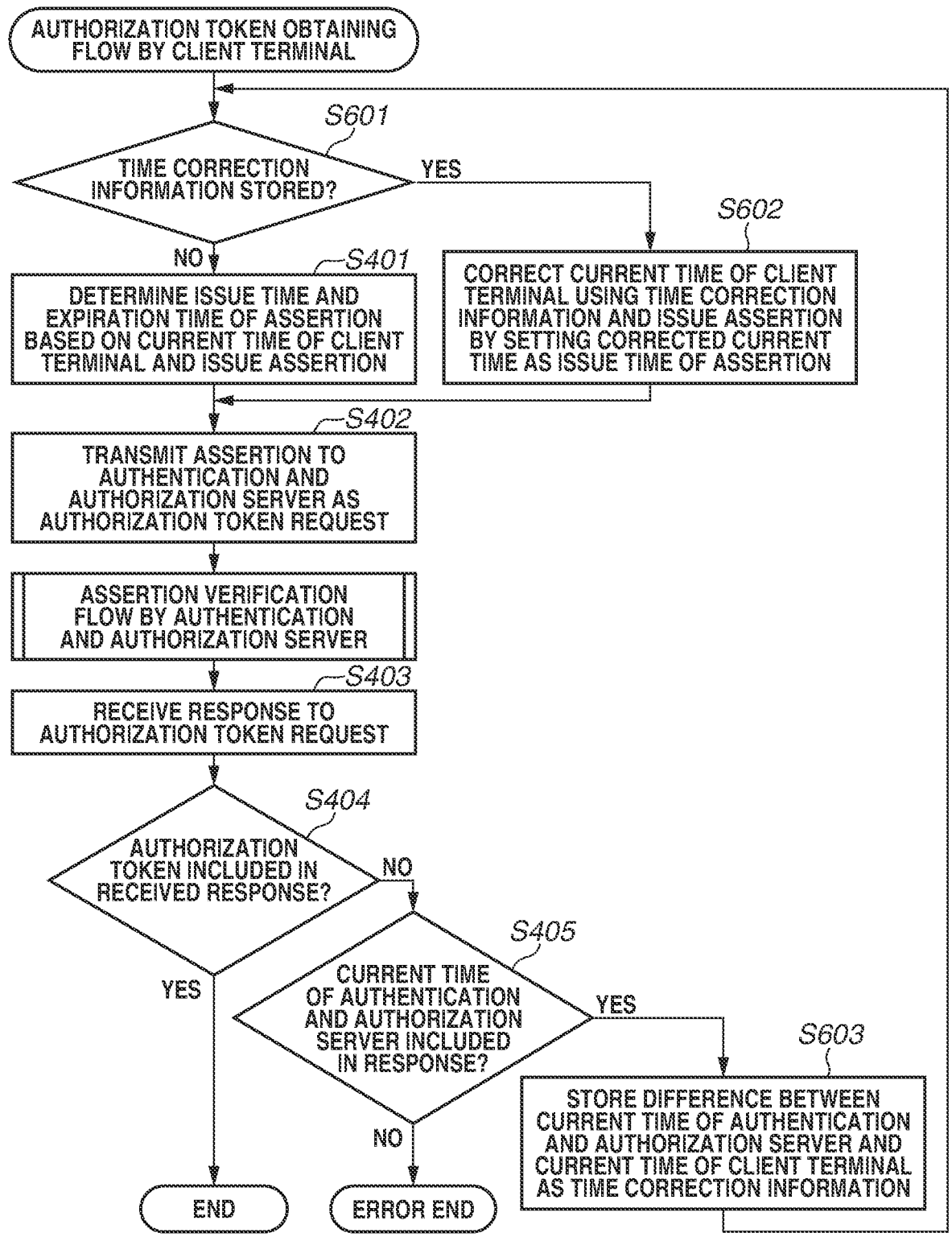
FIG. 6 is a flowchart illustrating obtaining of an authorization token by a client terminal according to a second exemplary embodiment.

FIG. 6 is a flowchart illustrating obtaining of an authorization token by the client terminal 130 using an assertion in the JWT format according to the second exemplary embodiment.

In step S601, the client terminal 130 checks whether time correction information is stored. The time correction information is a value recording a time difference between the authentication and authorization server 110 and the client terminal 130 and is managed by the client terminal 130. An example of the time correction information is described below. The time correction information is not stored in the client terminal 130 when the processing in the flowchart in FIG. 6 is executed for the first time (NO in step S601), and the processing proceeds to step S401. In the processing in FIG. 6 in the second and subsequent times, the time correction information is stored (YES in step S601), the processing proceeds to step S602.

In step S601, when it is determined that the time correction information is not stored (NO in step S601), in step S401, the client terminal 130 issues an assertion.

In step S601, when it is determined that the time correction information is stored (YES in step S601), in step S602, the assertion generation unit 1304 determines the issue time and the expiration time of the assertion based on the current time obtained by correcting the current time of the client terminal 130 using the time correction information and issues the assertion. Table 1 is an example of the time correction information. When the current time of the client terminal 130 is "2018.01.01 12:00:00", and stored time correction information is "+32400 seconds", a corrected current time will be "2018.01.01 21:00:00" which is a value after 32400 seconds. Accordingly, a time deviation from the authentication and authorization server 110 can be corrected.

TABLE 1

Example of Time Correction Table

| Time Correction Information |
| --- |
| +32400 seconds |

After the current time included in the error from the authentication and authorization server 110 is obtained by the processing in steps S402 to S405, in step S603, a time difference between the current time of the authentication and authorization server 110 and the current time of the client terminal 130 is stored as the time correction information. For example, in a case where the current time of the authentication and authorization server 110 is "2018.01.01 10:00:00" when the current time of the client terminal 130 is "2018.01.01 1:00:00", a time difference therebetween is calculated, and the time correction information is calculated as "+32400 seconds" and stored. After the calculation of the time correction information, the processing returns to step S601.

In the processing illustrated in FIG. 6, the client terminal 130 is assumed to include a clock. However, if the client terminal 130 does not include the clock, correction can be similarly performed by processing which handles the counter value of the client terminal 130 as UNIX (registered trademark) time.

Table 2 is an example of the time correction information calculated from a counter value. For example, when the counter value of the client terminal 130 is 30, the current time is specified as "1970.01.01 0:00:30" by calculating from a count start time "1970.01.01 00:00:00". Based on the specified current time, the time correction information as "+1514768370 seconds" can be calculated from the time difference from the current time of the authentication and authorization server 110 "2018.01.01 10:00:00".

TABLE 2

Example of Time Correction Table by Counter Value

| Count Start Time of Client Terminal 130 | Time Correction Information |
| --- | --- |
| 1970.01.01 00:00:00 | +1514768370 seconds |

According to the present exemplary embodiment, an assertion can be generated based on a time difference from the current time of the authentication and authorization server 110 regardless of whether the client terminal 130 includes a clock.

When the current time of the client terminal 130 is set to a future time with respect to the current time of the authentication and authorization server 110, an issue time of an assertion set to the assertion will be a future time with respect to the current time of the authentication and authorization server 110. According to the processing in the first exemplary embodiment, an authorization token request including the relevant assertion is determined as an error by the authentication and authorization server 110.

However, when the authorization token request including the same assertion is transmitted again to the authentication and authorization server 110 after waiting until the future time set to the assertion, an authorization token can be obtained, and a replay attack cannot be prevented.

Figure 7:
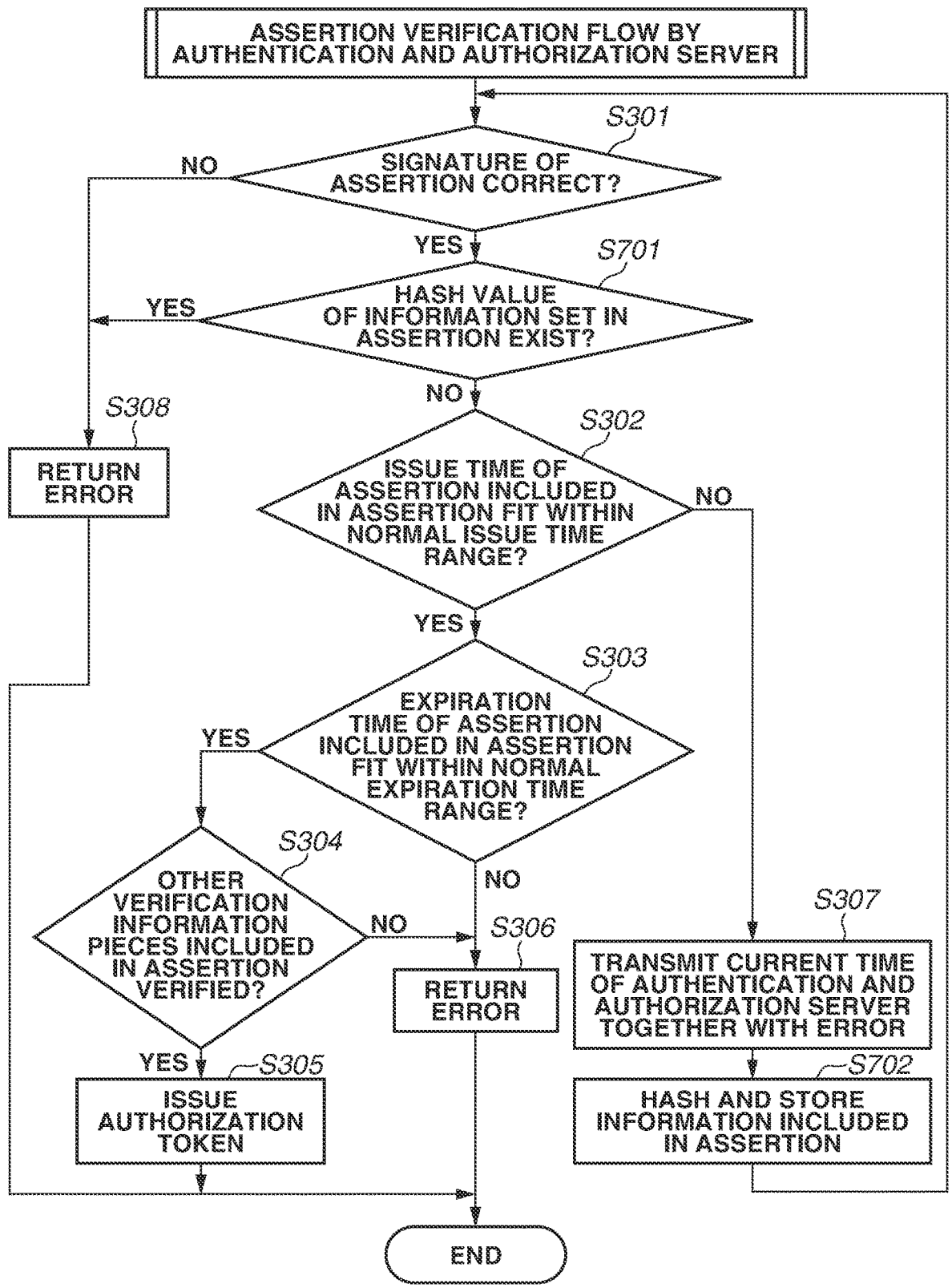
FIG. 7 is a flowchart illustrating verification of an assertion in a JWT format by an authentication and authorization server according to a third exemplary embodiment.

According to a third present exemplary embodiment, a method for preventing a replay attack by an assertion to which a future issue time is set is described with reference to FIG. 7. FIG. 7 is a flowchart illustrating verification of an assertion by the authentication and authorization server 110. It is assumed that the current time of the client terminal 130 is set to a future time with respect to the current time of the authentication and authorization server 110. Processing already described above is denoted by the same reference numeral, and the detailed description thereof is omitted.

In step S701, the authentication and authorization server unit 1101 which receives the authorization token request verifies the assertion and then verifies the authorization token request. More specifically, the authentication and authorization server unit 1101 determines whether a hash value of the information included in the assertion (the verification information and the signature are included)

exists in a requested token table. When it is determined that the hash value does not exist (NO in step S701), the processing proceeds to step S302, and when it is determined that the hash value exists (YES in step S701), an error is returned.

An example of the requested token table is shown in Table 3. Table 3 includes the expiration time of the assertion set to the assertion, a hash value of the information included in the assertion, and an ID "001" for identifying the authorization token request which is already requested.

TABLE 3

Requested Token Table

| ID | Hash Value | Expiration Time (iat) |
|---|---|---|
| 001 | xxxxxxx | 2018.01.01 12:35:00 |
| 002 | yyyyyyy | 2018.01.01 12:00:00 |

In step S302, when it is determined that the issue time of the assertion is false, accordingly it is regarded as a false authorization token request. Further, in step S702, the information of the assertion included in the authorization token request determined as false is hashed, and the hash value thereof is stored in the requested token table (Table 3). The order of the processing in step S307 for transmitting the time of the authentication and authorization server 110 together with the error and the processing in step S702 does not matter.

A reason why the expiration time of the assertion is written in Table 3 is described. In the processing in step S302, the hash value is managed in the requested token table regardless of whether the issue time of the assertion is set to a future time or a past time with respect to the time of the authentication and authorization server 110. In order to manage only the authorization token request in which the issue time of the assertion is set in a future time and to prevent a replay attack, a record of which the expiration time of the assertion expires (or has already expired) is deleted from the requested token table. Accordingly, there is no need to manage the authorization token request which expired and has no risk of being used in a replay attack in the requested token table.

The verification processing of an assertion according to the present exemplary embodiment is described above.

According to the present exemplary embodiment, a false client terminal 130 which does not store the private key cannot sign and is rejected in the processing in step S301 even if the verification information is rewritten to correct information. In addition, if the verification information is not rewritten, the same authorization token request is transmitted to the authentication and authorization server 110, and thus the false client terminal 130 is rejected in the processing in step S701.

According to the present exemplary embodiment, an assertion is identified by a hash value, however, the identification method is not limited as long as an assertion can be uniquely identified, so that an assertion may be identified by including a token identifier (jti) therein or by a combination of an issuer (iss) and an issue time (iat).

According to the above-described sequence, an authorization token can be issued to a qualified client terminal 130 while preventing a replay attack by a token request to which a future time is set.

Other Embodiments

According to the above-described exemplary embodiments, it is described that the client terminal 130 prelimi- narily stores the private key used in a signature of an assertion therein, however, the above-described exemplary embodiments are not limited to this configuration. The client terminal 130 may access the authentication and authorization server 110 to perform authentication and store a private key issued by the authentication and authorization server 110.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-015726, filed Jan. 31, 2018, which is hereby incorporated by reference herein in its entirety.

What is claimed is:
1. An information processing system comprising:
a client terminal configured to add a signature using an encryption key to a request; and
an authentication and authorization server which issues an authorization token for accessing a resource server and which is configured to verify the signature added to the request from the client terminal using a decryption key,
wherein the client terminal comprises:
one or more first processors; and
at least one first memory coupled to the one or more first processors and having stored thereon first instructions, which when executed by the one or more first processors, cause the client terminal to:
transmit, to the authentication and authorization server, an authorization token request including a time at which the signature is issued in order to obtain an authorization token; and
receive and verify, from the authentication and authorization server, a response to the authorization token request, wherein the authentication and authorization server comprises:

one or more second processors; and at least one second memory coupled to the one or more second processors and having stored thereon second instructions, which when executed by the one or more second processors, cause the authentication and authorization server to:

determine whether at least a predetermined time difference is present between an issue time of the signature included in the authorization token request and a time of the authentication and authorization server; and respond based on a determination result of the determination, wherein, in a case where the authentication and authorization server determines that at least a predetermined time difference is present between an issue time of the signature included in a first authorization token request and the time of the authentication and authorization server, the authentication and authorization server responds to the client terminal with an error including the time of the authentication and authorization server, and wherein, in a case where the client terminal verifies that the error includes the time of the authentication and authorization server, the client terminal transmits a second authorization token request including the time of the authentication and authorization server to the authentication and authorization server, wherein the first instructions, when executed by the one or more first processors, further cause the client terminal to:

manage a time difference between the time of the authentication and authorization server included in the error and a time of the client terminal; and transmit a third authorization token request including the issue time corrected based on the time difference to the authentication and authorization server.

2. The information processing system according to claim 1, wherein, in a case where the authentication and authorization server determines that at least a predetermined time difference between an issue time of the signature included in the second authorization token request and the time of the authentication and authorization server is not present, the authentication and authorization server responds to the client terminal with the authorization token.

3. The information processing system according to claim 1, wherein the client terminal verifies whether the authorization token is included in the response, in a case where the authorization token is not included in the response, the client terminal verifies whether the time of the authentication and authorization server is included in the response, and in a case where the client terminal verifies that the time of the authentication and authorization server is included, the client terminal transmits the second authorization token request including the time of the authentication and authorization server.

4. The information processing system according to claim 1, wherein the second instructions, when executed by the one or more second processors, further cause the authentication and authorization server to:

calculate a hash value based on information and a signature included in the authorization token request and store the hash value, wherein the authentication and authorization server calculates a hash value based on information and a signature included in an authorization token request received from the client terminal, determines whether the calculated hash value is included in the stored hash value, and transmits the error in a case where it is determined that the calculated hash value is included.

5. The information processing system according to claim 4, wherein the stored hash value is calculated based on the information and the signature included in the authorization token request in a case where the authentication and authorization server determines that at least a predetermined difference is present between an issue time of the signature included in the authorization token request and the time of the authentication and authorization server.

6. The information processing system according to claim 4, wherein the authentication and authorization server stores an expiration time of the signature and deletes a hash value of the signature of which the expiration time expires.

7. A method for controlling an information processing system comprising a client terminal configured to add a signature using an encryption key to a request, and an authentication and authorization server which issues an authorization token for accessing a resource server and which is configured to verify the signature added to the request from the client terminal using a decryption key, the method comprising:

causing the client terminal to perform transmitting, to the authentication and authorization server, an authorization token request including a time at which the signature is issued in order to obtain an authorization token, and receiving and verifying, from the authentication and authorization server, a response to the authorization token request;

causing the authentication and authorization server to perform determining whether at least a predetermined difference is present between an issue time of the signature included in the transmitted authorization token request and a time of the authentication and authorization server, and responding based on a determination result by the determining;

responding to the client terminal with an error including the time of the authentication and authorization server in a case where it is determined by the determining that at least a predetermined difference is present between an issue time of the signature included in a first authorization token request transmitted by the transmitting and the time of the authentication and authorization server;

transmitting a second authorization token request including the time of the authentication and authorization server to the authentication and authorization server in a case where it is determined by the determining that the error includes the time of the authentication and authorization server;

managing, by the client terminal, a time difference between the time of the authentication and authorization server included in the error and a time of the client terminal; and transmitting a third authorization token request including the issue time corrected based on the time difference to the authentication and authorization server.

8. A client terminal which adds a signature using an encryption key to a request to an authentication and authorization server which issues an authorization token for accessing a resource server, the client terminal comprising:

one or more processors; and at least one memory coupled to the one or more processors and having stored thereon instructions, which when executed by the one or more processors, cause the client terminal to:
- transmit, to the authentication and authorization server, a first authorization token request including an issue time at which the signature is issued in order to obtain an authorization token;
- receive a response to the first authorization token request from the authentication and authorization server;
- transmit, in a case where the response is an error, a second authorization token request including a time of the authentication and authorization server together with the received error;
- manage a time difference between the time of the authentication and authorization server and a time of the client terminal; and
- transmit a third authorization token request including the issue time corrected based on the time difference to the authentication and authorization server.

9. The client terminal according to claim 8, wherein the instructions, when executed by the one or more processors, further cause the client terminal to:
- receive the authorization token from the authentication and authorization server,
- wherein the client terminal transmits the authorization token to the resource server and uses a service provided by the resource server.

10. The client terminal according to claim 8, wherein the instructions, when executed by the one or more processors, further cause the client terminal to:
- verify an authorization token request received from the authentication and authorization server,
- wherein the client terminal verifies whether the authorization token is included in the response, verifies whether the time of the authentication and authorization server is included in the response in a case where it is determined that the authorization token is not included in the response, and transmits the second authorization token request including the time of the authentication and authorization server in a case where it is determined that the time of the authentication and authorization server is included in the response.

11. A method for controlling a client terminal which adds a signature using an encryption key to a request to an authentication and authorization server which issues an authorization token for accessing a resource server, the method comprising:
- causing the client terminal to transmit, to the authentication and authorization server, a first authorization token request including an issue time at which the signature is issued in order to obtain an authorization token;
- receiving a response to the transmitted first authorization token request from the authentication and authorization server;
- transmitting, in a case where the received response is an error, a second authorization token request including a time of the authentication and authorization server together with the received error;
- managing a time difference between the time of the authentication and authorization server and a time of the client terminal; and
- transmitting a third authorization token request including the issue time corrected based on the time difference to the authentication and authorization server.

12. A non-transitory computer-readable storage medium storing instructions, which when executed by one or more processors of a client terminal configured to add a signature using an encryption key to a request to an authentication and authorization server which issues an authorization token for accessing a resource server, cause the client terminal to:
- transmit, to the authentication and authorization server, a first authorization token request including an issue time at which the signature is issued in order to obtain an authorization token;
- receive a response to the first authorization token request from the authentication and authorization server;
- transmit, in a case where the response is an error, a second authorization token request including a time of the authentication and authorization server together with the received error;
- manage a time difference between the time of the authentication and authorization server and a time of the client terminal; and
- transmit a third authorization token request including the issue time corrected based on the time difference to the authentication and authorization server.

* * * * *